March 9, 1965 H. J. HIBSHMAN 3,172,818
HETEROGENEOUS NUCLEAR REACTORS
Filed Sept. 30, 1959 5 Sheets-Sheet 1

Henry J. Hibshman    Inventor

By  Robert M. Lazo
                Patent Attorney

March 9, 1965 H. J. HIBSHMAN 3,172,818
HETEROGENEOUS NUCLEAR REACTORS
Filed Sept. 30, 1959 5 Sheets-Sheet 2

Henry J. Hibshman Inventor

By Robert M. Lazo

Patent Attorney

March 9, 1965 H. J. HIBSHMAN 3,172,818
HETEROGENEOUS NUCLEAR REACTORS
Filed Sept. 30, 1959 5 Sheets-Sheet 3

FIG. 9

Henry J. Hibshman    Inventor

By Robert M. Lazo
                Patent Attorney

March 9, 1965  H. J. HIBSHMAN  3,172,818
HETEROGENEOUS NUCLEAR REACTORS
Filed Sept. 30, 1959  5 Sheets-Sheet 4

FIG. 10

Henry J. Hibshman  Inventor

By  Robert M. Lazo
Patent Attorney

March 9, 1965 H. J. HIBSHMAN 3,172,818
HETEROGENEOUS NUCLEAR REACTORS
Filed Sept. 30, 1959 5 Sheets-Sheet 5

FIG. 11

Henry J. Hibshman   Inventor
By Robert M. Lazo.
Patent Attorney

United States Patent Office 3,172,818
Patented Mar. 9, 1965

3,172,818
HETEROGENEOUS NUCLEAR REACTORS
Henry J. Hibshman, Plainfield, N.J., assignor to Esso Research and Engineering Company, a corporation of Delaware
Filed Sept. 30, 1959, Ser. No. 843,555
13 Claims. (Cl. 176—29)

This invention relates to nuclear reactions and more particularly relates to an improved method and apparatus for carrying out nuclear reactions. Still more particularly, the invention relates to improved heterogeneous nuclear reactors utilizing a movable fuel element and to their method of operation.

This application is a continuation-in-part of prior pending application, Serial No. 593,013, filed June 18, 1956, by the present inventor, now abandoned.

The importance and uses of nuclear reactors or atomic piles are well known. These nuclear reactors are designed to induce fission and to maintain and control chain reactions. They can be designed to produce power, supply neutrons, produce radioactive isotopes, initiate nuclear reactions, produce plutonium from U–238, and initiate and promote chemical reactions, particularly chain reactions. All rely on the same principles of operation—nuclear fission and a self-sustaining chain reaction.

Nuclear reactors are classified as heterogeneous or homogeneous reactors. In a heterogeneous reactor, the fuel is in distinct shapes, usually in solid form, such as rods, slugs or plates. Generally it is either placed in the moderator in channels in a lattice-like arrangement or arranged as rods in a liquid moderator if the moderator is in that form. In a homogeneous reactor, the fissionable material or fuel is intermixed usually in a solution with the moderator and distributed uniformly throughout the core of the reactor. The majority of the nuclear reactors which have been built to date are of the heterogeneous type.

Heterogeneous nuclear reactors proposed heretofore have a number of limitations. More particularly, the flux produced in these nuclear reactors has been lower than would be desired. Generally the intensity of flux has been limited by the means available for removing the heat of nuclear reaction. In addition, difficult problems of materials handling have been encountered in certain reactor designs because the coolant is made radioactive and/or chemically decomposes in the cooling operation when used in direct heat exchange relationship with the fuel elements. Because of the aforementioned problems, it has not been possible heretofore to make high flux nuclear reactors. Because of the importance of this new field, there is a continuing need for new and improved reactor designs. These aforementioned problems of the prior art nuclear reactors are overcome by the present invention.

A novel method and apparatus have now been found for carrying out nuclear reactions in a heterogeneous type nuclear reactor. In accordance with the present invention, heat is removed from heterogeneous nuclear reactors faster than has been possible heretofore by moving solid fuel (i.e., fissionable material in solid form) into and out of a critical mass zone with external cooling of the solid fuel. More particularly, the improved nuclear reactor of the present invention comprises at least two solid fuel elements, at least a minor portion of each being disposed for association in critical mass relationship to form a reactor core. At least one of the fuel elements has a portion thereof external to the core. Means are provided for moving at least one of the fuel elements having a portion thereof external to the core essentially continuously through the core to separate the minor portions of each fuel element and quench the nuclear reaction existing therebetween. Means are provided also for cooling at least one of the moving fuel elements external to the core. Preferably all of the solid fuel elements are moving and each is cooled external to the core. If desired, the solid fuel elements may also be cooled while in the critical mass zone. The improved method of the present invention employed for effecting a controlled nuclear reaction thus comprises moving a source of fissionable material essentially continuously through a zone of critical mass, a portion only of this source being in the zone of critical mass, and cooling the remaining portion of the source external to the zone of critical mass. The present invention is applicable to nuclear reactions carried out wherein the neutrons are utilized at low, intermediate or high energies and thus the nuclear reactors of the present invention may be thermal, intermediate or fast reactors. It should be noted that a fast reactor does not require a moderator and has the advantage that uranium 238 may be used as one component of the fuel provided at least one spontaneously fissionable fuel such as U–235 is present to initiate reaction.

The present novel high flux reactors are particularly useful for power applications, for supplying neutrons, producing power and radioactive isotopes, for materials testing and for effecting chemical reactions such as hydrocarbon conversions.

The nuclear reactors of the present invention have a number of advantages, including (1) extremely effective cooling with an added advantage that the induced radioactivity of the coolant is substantially reduced, and (2) extraordinarily high radiation fluxes. Generally, at least about 99% of the total neutrons given off in a nuclear reaction are "prompt" neutrons, i.e., neutrons which are emitted from the nuclear reaction within milliseconds. About half or more of the remainder, i.e., the "delayed" neutrons, are given off within ten seconds. Thus the movement of the movable solid fuel elements through the critical mass zone can be adjusted so as to substantially reduce the emission of neutrons external to the critical mass zone. If desired, a material such as beryllium (neutron reflector) or cadmium or boron (neutron absorbers) may be used external to the critical mass zone to eliminate neutrons in this area. Although the present reactors will require a relatively large inventory of fissionable material since some of this material is external to the critical mass zone, this is partially offset by the fact that a lesser amount of fissionable material is required at high flux levels to operate at a given power level.

The instant invention will be more readily understood by reference to the attached drawings, of which.

Figure 1:
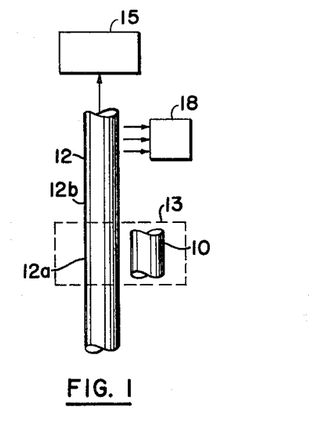
FIG. 1 is a diagrammatic illustration of the essential elements of the present nuclear reactor.

Referring now to FIG. 1, reference numeral 10 designates a solid fuel mass or solid fuel element, and reference numeral 12 designates a second solid fuel mass or solid fuel element. These solid fuel elements contain a fissionable material such as uranium 235, uranium 233 and plutonium 239. It will be understood that these fissionable materials or elements may be combined physically or chemically with other elements or isotopes. It is particularly desirable to alloy these fissionable materials with other elements to form high melting point alloys such as, for example, uranium carbide (M.P.=2427° C.), uranium oxide (M.P.=2176° C.), etc. The uranium carbide has the additional advantage of having carbon which serves as a moderator. Solid fuel elements 10 and 12 are disposed for association in critical mass relationship to form a reactor core indicated by reference numeral 13. Thus the mass of fissionable material in core 13 is at least equal to and generally greater than the critical mass for the particular fissionable material employed. The mass distribution of each of the individual fuel elements 12 and 10 will be below the critical mass (for the particular fissionable material) which is necessary to maintain a continuous nuclear chain reaction (i.e., the mass distribution of fissionable material contained in each of the individual fuel elements is insufficient to maintain a continuous nuclear chain reaction per se). Thus it is necessary to dispose fuel elements 12 and 13 in close proximity to thereby produce a zone of critical mass in core 13. When just enough fissionable material is present to initiate a chain reaction, the system is said to go critical and the amount of fuel is termed a critical mass. It will be understood that the critical mass in a particular system will depend upon the nature of the fissionable material and the geometry of the system. These particular amounts and arrangements are well known in the art. In accordance with the present invention, at least one of the fuel elements has a portion thereof external to the core. In FIG. 1, fuel element 12 is such a fuel element. Thus it will be noted that portion 12a of fuel element 12 is disposed within core 13 and portion 12b is disposed external to core 13. If fuel element 12 were to remain stationary in close proximity to and in critical mass relationship to fuel element 10, an uncontrolled nuclear reaction (with respect to temperature, not necessarily with respect to fission) would take place. However, in accordance with the present invention, fuel element 12 is moved continuously through core 13, that is the zone of critical mass, by means of transport means 15, which will be described in greater detail hereinafter. A particular portion of fuel element 12 is thus moved into and out of core 13 whereby successive portions thereof are repetitively passed into critical mass relationship with fuel element 10 and then separated to quench the nuclear reaction. The portion of fuel element 12 which is external to core 13 is cooled to remove the heat of nuclear reaction. For example, portion 12b of fuel element 12 may be cooled by cooling means 18, which will be described hereinafter in greater detail. Preferably moving fuel element 12 is substantially continuous in structure such that a portion (preferably a minor portion) thereof is constantly within core 13 and the remainder thereof (preferably a major portion) is external to core 13 wherein it is in heat exchange relationship with cooling means. The moving fuel elements may be designed to be, for example, in the form of circular rotatable elements (e.g., discs) or essentially continuous elongated elements (e.g., belts). In the operation of the nuclear reactor of FIG. 1, fuel element 12 is moved essentially continuously through core 13. It will be understood that fuel elements 10 and 12 may each represent one or more solid fuel elements and, further, that if desired, all of the fuel elements within core 13 may be moved essentially continuously through core 13. If desired, one or more stationary fuel elements may also be arranged within core 13.

Generally in the operation of a nuclear reactor of the present invention such as that shown in FIG. 1, the temperature in core 13 may be maintained as high as is possible, as limited by the melting points of the fuel elements within core 13. Usually the temperature in core 13 will be about 100° to 1800° F. or higher, the maximum temperature being limited only by the melting points and strengths of the materials employed in the reactor design. The radiation flux produced in core 13 of the present type of nuclear reactor may range as high as about $10^{16}$ to $10^{18}$ neutrons/cm.$^2$/sec., as limited by heat removal. Usually the radiation flux will be maintained at about $10^{12}$ to $10^{16}$ neutrons/cm.$^2$/sec. It will be understood that gamma rays (and some beta rays) are also given off in the nuclear reactions, and that for a given nuclear reactor design the gamma ray flux will vary proportionally with the fast neutron flux. The critical mass of fissionable material in the core 13 will depend upon the type of fissionable material employed as well as its physical distribution (or geometry) within zone 13. Specific power will depend on these factors plus the thermal flux. An approximate relationship between thermal flux and specific power (kilowatt capacity per ton of uranium 235) is shown below.

| Thermal neutron flux: | Specific power |
| --- | --- |
| $10^{12}$ | $5 \times 10^4$ |
| $10^{14}$ | $5 \times 10^6$ |
| $10^{15}$ | $5 \times 10^7$ |
| $10^{16}$ | $5 \times 10^8$ |

Generally the movement of the moving fuel elements through core 13 will be in the range of about 1 to 1000 ft./sec. linear velocity, usually about 10 to 300 ft./sec. (assuming a time in the critical mass zone of the order of about 0.001 to 1 second, usually about 0.01 to 0.1 second). The actual speed of movement of the moving fuel elements through core 13 will depend upon a number of factors such as (1) the number and nature of moving fuel elements in the reactor, (2) the temperature of nuclear reaction within core 13, and (3) the cooling capacity of the cooling means for the moving fuel elements external to core 13.

The moving fuel elements which are external to core 13 may be cooled by coolants such as air, hydrogen, helium, light water, heavy water, sodium, sodium-potassium alloy, lead-bismuth alloy, lithium, fused salts such as LiCl—KCl eutectic mixture, mercury, Dow-Therm, etc.

The cooling means in the present invention should generally have a capacity for heat removal of up to about $10^9$ (or more), usually about $10^3$ to $10^7$ B.t.u.'s per hour. It will be understood that the total heat load and the size of the reactor will depend on the intended use of the reactor; i.e., research reactors range from about 10 to 50,000 kilowatts and power reactors range from about 5,000 to 100,000 kilowatts. As an example of the heat to be removed the following is given: At a flux in the range of $10^{15}$ to $10^{16}$ neutrons/cm.$^2$/sec., the specific power load is $10^8$ kilowatts/ton of fuel; thus, if 2 lbs. of uranium 235 fuel is used in the critical mass reaction zone (not in the entire system) the heat load will be about $10^5$ kilowatts or about $3.4 \times 10^8$ B.t.u./hour.

Figure 2:
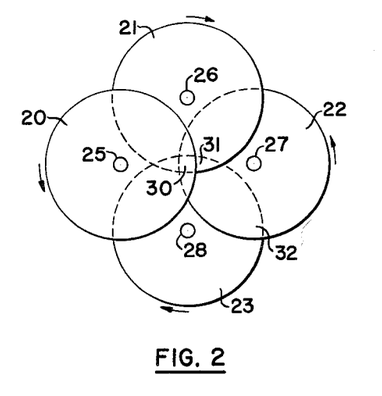
FIG. 2 is a top view of a particularly preferred nuclear reactor design of the present invention.

Referring now to FIG. 2, a particularly preferred nuclear reactor design in accordance with the present invention is shown. The reactor contains two or more support rods which are positioned within the housing of the reactor in parallel relationship with each other and in spaced relationship with one another to form the corners or edges of a plane passed through the rods perpendicular to the axis of the support rods. In FIG. 2, the solid fuel elements are in the form of a plurality of circular rotatable elements such as the four discs, namely, discs 20, 21, 22 and 23 disposed in parallel spaced and partial overlapping relationship. The plates are positioned on the support rods alternately in a direction parallel to the axis of the support rods. Each of these fuel element discs is mounted on a shaft, namely, shafts 25, 26, 27 and 28. Discs 20 to 23 may be constructed entirely of a fissionable material such as uranium 235 but are preferably constructed of a high melting point alloy of a fissionable material, such as uranium 235 carbide. Each of fuel element discs 20 to 23 is rotated about its axis by means of shafts 25 to 28 respectively. The discs can be encased or clad in conventional or any suitable manner to prevent corrosion and escape of radioactive by-products of the fission reaction. Discs 20 to 23 are arranged so as to overlap in a common central area which forms the critical mass zone to thereby effect a nuclear reaction. Reference numeral 30 designates a zone wherein all four of the discs have a common overlap which zone is an area of intense radiation. Reference number 31 designates a zone of overlap between discs 21, 22 and 23, this zone producing an intermediate radiation flux. Reference numeral 32 designates a zone of overlap of discs 22 and 23, this zone being a zone of comparatively low radiation flux. It will be understood that in certain designs, zones 31 and 32 need not be parts of the zone of critical mass. In this case, zone 30 would be the only zone of critical mass. It will also be understood that the discs may be arranged to be in horizontal, vertical or inclined planes. If desired, the speeds of rotation of discs 20 to 23 are such that those portions of discs 20 to 23 outside of the zone of critical mass have no appreciable amount of delayed neutrons emitted. This makes it possible to effect the cooling operation in these areas without inducing essentially any radioactivity into the coolant due to the action of neutrons upon the coolant.

Figure 4:
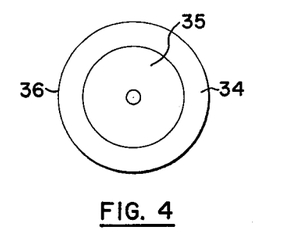
FIG. 4 is a drawing of a modified solid fuel element which may be employed in the present invention.

If desired, the rotating fuel element discs need not contain fissionable material in the entire area thereof, that is, they can contain non-fissionable material. This is illustrated in FIG. 4. Thus it will be noted that disc 36 comprises an outer ring 34 containing fissionable material and an inner disc 35 which does not contain fissionable material. Inner disc 35 may be constructed, for example, of steel. In this way (i.e., by providing the rotate elements with fissionable material solely in their peripheral area of overlap), it is possible to reduce the inventory of fissionable material necessary to effect the nuclear reaction in the nuclear reactor shown in FIG. 2.

Preferably those portions of discs 20 to 23 and 36 which participate in the nuclear reaction are coated with a material such as aluminum, steel, etc. Preferably the coating material has a high melting point to prevent the escape or loss of fissionable by-products. In this way, contamination of the surrounding atmosphere, the coolant, etc. with radioactive materials is substantially reduced or eliminated. The coating or jacket material also prevents corrosion or erosion of the fuel element discs by the cooling fluid.

Figure 3:
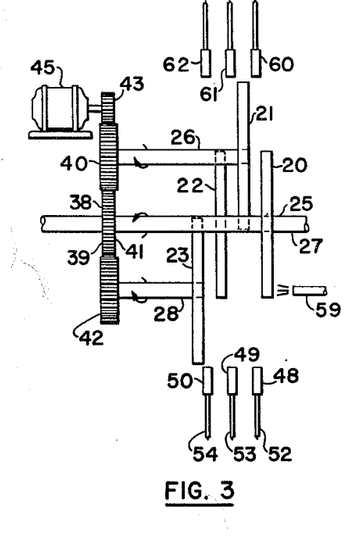
FIG. 3 is a front view of the nuclear reactor of FIG. 2, including moderator and control elements.

Referring now to FIG. 3 a plan view is shown of the nuclear reactor shown in elevation in FIG. 2. It will be noted that fuel element discs 20 to 23 are rotated respectively by shafts 25 to 28 by mechanical drive means, e.g., gearing mechanism 38 comprising gears 39, 40, 41 and 42, which in turn are driven by gear 43 operated by means of motor or prime mover 45. It will be understood that discs 20 to 23 may be revolved at different speeds if desired. It will be further understood, however, that shafts 25 to 28 may be operated independently by independent prime movers if desired. Preferably the shafts 25 to 28 are adjustable in a manner such as to permit movement of each disc relative to the other discs. More particularly, the shafts should be adjustable laterally to permit varying the area of overlap of the discs. In addition, they are preferably adjustable axially to permit varying the distance between surfaces of the various discs. In this way, the nuclear reaction effected by the fuel element discs may be closely controlled. Furthermore, this movement or adjustment of the discs may be employed advantageously as a safety measure. More particularly, a control means may be provided which can separate the discs completely from each other in the event that an uncontrolled nuclear reaction commences. This mechanism can also be employed when it is desired to shut down the reactor for repair or the like.

Reference numerals 48, 49 and 50 designate solid moderator bars which may be employed in the nuclear reactors shown in FIGS. 2 and 3. More particularly, these moderators 48 to 50 may be moved into the zone of critical mass within the nuclear reactor to thereby slow down the neutrons emitted within the zone of critical mass. These moderators 48 to 50 are provided, respectively, with rods 52, 53 and 54 for movement of the moderators into position within the critical mass zone. These moderators may be constructed of graphite, beryllium, etc. Liquid moderators such as high boiling hydrocarbons, e.g., petroleum oils, may also be employed as moderators if the temperatures involved are not too high. The nuclear reactor shown in FIGS. 2 and 3 may also be provided with control rods 60, 61 and 62 which are employed in the nuclear reaction by absorbing primarily slow neutrons (the neutrons which carry on the chain reaction). These control rods may be constructed of boron, steel, cadmium, and, if desired, in certain instances, of gold, mercury, samarium, europium and gadolinium. These control rods may be moved into the nuclear reactor within the zone of critical mass to thereby control the reaction by neutron absorption.

Figure 5:
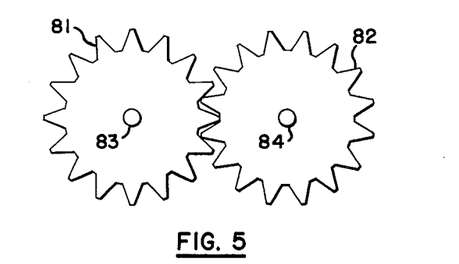
FIG. 5 is a diagrammatic showing of a particular arrangement of solid fuel elements which may be employed in the present invention.

It will be understood that the present invention is not limited to the specific arrangement of elements shown in the FIGS. 2 and 3. More particularly, it will be understood that if desired two or more discs may be employed and, further, that additional discs may be provided on any or all of the shafts shown in FIGS. 2 and 3. Similarly, lesser or greater movements of control rods and moderator elements may be employed. Further, it will be understood that the overlap of discs shown in FIGS. 2 and 3 is not absolutely necessary because, if desired, the nuclear reactor may be operated simply by bringing the periphery of the discs in close proximity and in critical mass relationship. An example of such a preferred arrangement of this type is shown in FIG. 5 wherein the two rotate elements, namely, gears 81 and 82, which are constructed of a fissionable material, are disposed in interlocking relationship with respect to their gear teeth. The zone of critical mass in this case occurs at the zone of interlock. The gears 81 and 82 operate from shafts 83 and 84, respectively.

Figure 6:
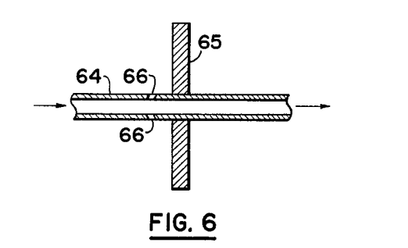
FIG. 6 is a diagrammatic showing of a particular arrangement for cooling the solid fuel elements of the present invention.

In one embodiment of the present invention, the shafts are hollow, whereby a coolant liquid may be passed therethrough for the purpose of cooling the discs. This arrangement is shown in FIG. 6 wherein a coolant such as water is passed through hollow shaft 64 to thereby aid in cooling disc 65. Also, shaft 64 may contain perforations such as ports 66 whereby the coolant may be sprayed onto the surface of disc 65.

Figure 7:
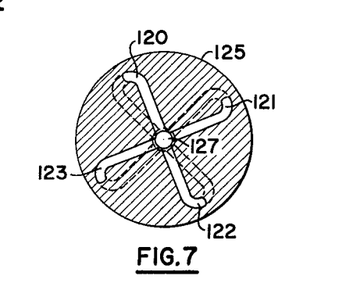
FIG. 7 is a cross-sectional view of another arrangement for cooling the solid fuel elements of the present invention.

Further, the degree of cooling may be effected by providing veins within the discs or on the surface thereof whereby the coolant liquid may be circulated throughout the interior or exterior of the discs. This arrangement is shown in top cross-sectional view in FIG. 7. In this embodiment of the invention the veins 120, 121, 122 and 123 are arranged within disc 125 which is constructed of fissionable material. The coolant liquid flowing through hollow shaft 127, in this instance flowing upwardly passes into the lower sections of the veins (dotted lines) and flows through the veins and returns to hollow shaft 127 through the upper sections of the veins (solid lines). In this arrangement it is preferred to provide restrictions, such as plates, within hollow shaft 127 between the inlet and outlet of the veins to promote circulation of the coolant through the veins. If desired, the veins may also be provided with perforations whereby the coolant may be sprayed onto the surface of disc 125. The portions of discs 20 to 23 external to the zone of critical mass may also be cooled by contact with a stream or bath of coolant such as spray 59 shown in FIG. 3.

Figure 8:
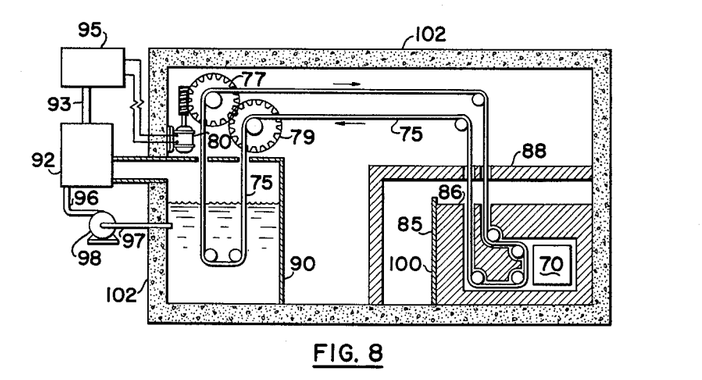
FIG. 8 is a diagrammatic illustration of a second nuclear reactor design of the present invention.

Referring now to FIG. 8, reference numeral 70 designates a fixed source of fissionable material which is a solid fuel element. Arranged in critical mass relationship with fixed fuel element 70 is moving fuel element 75 which may be in the form of a substantially continuous elongated element such as a belt, band, chain, wire, or the like. Fuel elements 70 and 75 may consist of pure fissionable materials or alloys of such materials with other elements as explained in greater detail heretofore. These moving solid fuel elements may also contain fins to provide greater heat transfer surface. Also, the moving solid fuel elements may comprise blocks of fissionable material attached at intervals to flexible metal belts or chains which serve as carriers for the fissionable material. If desired, the fixed fuel element 70 may be provided with veins (not shown) through which a coolant may be passed to remove heat produced in the fission reaction. Moving fuel element 75 is moved essentially continuously through the zone of critical mass in the area of fixed fuel element 70. The movement of fuel element 75 is effected by means of driving wheels (or rollers or pulleys) 77 and 79, which are driven by motor 80, as shown in FIG. 4. Fixed fuel element 70 and that portion of moving fuel element 75 in close proximity thereto are arranged within tank 85 which contains a moderator such as, for example, graphite. Liquid moderators such as light water, heavy water and the like may also be employed, but this will necessitate maintaining these materials under pressure due to the high temperatures and resultant pressures within tank 85.

This moderator is indicated by reference numeral 86 and surrounds the area of critical mass of fuel elements 70 and 75. Also arranged about tank 85 is reflector 88 which reduces the loss of neutrons outside of the core of the reactor formed by solid fuel elements 70 and 75. Neutron reflector 88 may be constructed of beryllium, graphite, etc., or may comprise heavy or light water.

Moving fuel element 75 passes through vapor-tight seals into boiler 90 which contains a liquid vaporizable coolant such as light water, heavy water, Dow-Therm, terphenyl, or the like. The coolant employed in boiler 90 is a vaporizable material, the vapors of which are passed to turbine 92 to operate same. Boiler 90 serves as a means for cooling moving fuel element 75 by direct heat exchange with the vaporizable coolant therein and thereby provides a means of removing the heat of nuclear reaction from the critical mass zone. More particularly, moving fuel element 75, when moving into the zone of critical mass, generates a considerable amount of heat due to the nuclear reaction. This heat is then conveyed from the critical mass zone by moving fuel element 75 to boiler 90 wherein by direct heat exchange this amount of absorbed heat is released to the coolant contained in boiler 90. It will be appreciated that a number of heat transfer arrangements may be employed at this point in the present invention. In one arrangement, for example, the moving fuel elements may be passed in direct heat exchange with a coolant liquid and this coolant liquid may then be passed in indirect heat-exchange with the vaporizable liquid in boiler 90. This arrangement would eliminate the necessity of maintaining vapor-tight seals at the points where the moving fuel elements pass through the wall of boiler 90 as shown in FIG. 8.

Turbine 92 which is operated by the vapors produced in boiler 90 is employed to operate generator 95 by means of shaft 93 to thereby produce electrical power. A portion of the electrical power produced in generator 95 is employed to operate motor 80, which in turn operates driving wheels 77 and 79 which move moving fuel element 75. The condensed vapors from turbine 92 may be passed through lines 96 and 97 by means of pump 98 and returned to boiler 90.

The apparatus of FIG. 8, including the nuclear reactor 100 (which comprises fixed fuel element 70, moving fuel element 75, moderator 86 and reflector 88) and boiler 90, is surrounded by a shield 102 of radioactivity absorbing material. Shield 102 protects personnel working in the area from a high intensity radiation emitted by the radioactive materials contained therein. The material of which shield 102 is constructed may be ordinary concrete made with Portland cement or the like. However, preferably a dense concrete is employed which contains lead or barium. Preferably, an inner layer of steel or cast iron is employed and also, if desired, a coolant such as water may be circulated throughout shield 102 to provide shield cooling. The inner layer of steel is desired in order to prevent an excessive temperature drop across the concrete on account of heat generated within the concrete due to gamma ray absorption. Preferably the temperature differential through the concrete wall does not exceed about 50° F. Also, if desired, natural or forced convector using gases can be used for heat removal within the system.

It will be understood that more than one moving fuel element may be employed in the embodiment of the invention shown in FIG. 8. In general, it is desired that all of the fuel elements be moving fuel elements. Preferably all of the moving fuel elements are cooled external to the zone of critical mass by direct or indirect heat exchange with a coolant. Of course, it will be understood that each of the moving fuel elements is passed through the zone of critical mass. Also, it will be understood that a non-vaporizable liquid coolant may be employed to cool the moving fuel elements. In this case, the coolant may be passed in indirect heat exchange with a vaporizable material such as ordinary water to thereby generate steam for power production.

A number of the advantages of the present invention are illustrated in FIG. 8. More particularly, the cooling for nuclear reactor 100 is effected outside of the critical mass zone. Because essentially no neutrons are present in the cooling zone, namely, boiler 90, no radioactivity is induced in the coolant. This generally avoids one of the problems encountered in the prior art reactors. Further, the present invention provides a high degree of cooling of the moving fuel elements. This in turn makes possible a higher degree of nuclear reaction in reactor 100 than was heretofore possible, thereby achieving extraordinarily high intensity radiation fluxes.

The high flux nuclear reactors of the present invention, such as those described above in detail, have many advantageous applications. For example, they can be employed for experimental purposes wherein a very high flux is desired. These high flux nuclear reactors of the present invention can thus make possible new discoveries which were not heretofore possible with the lower flux conventional nuclear reactors. Also, the high radiation fluxes developed in the present nuclear reactors may be employed to produce radioisotopes such as cobalt 60 in a much shorter period of time than has been heretofore possible. Also, chemical reactions such as hydrocarbon conversions can be carried out more effectively and in a shorter period of time. In addition, certain chemical reactions which can be effected only by a high degree of flux are now made possible when using the present nuclear reactors. It will be understood that the nuclear reactors of the present invention can be employed for generating power in atomic rockets, submarines, aircraft, ships, locomotives and the like.

A specific design of the present nuclear reactor will now be described with reference to FIGS. 9, 10 and 11, which show a heterogeneous, enriched uranium, heavy water moderated research reactor embodying the principle of a rotating solid fuel element in accordance with the present invention.

Figure 9:
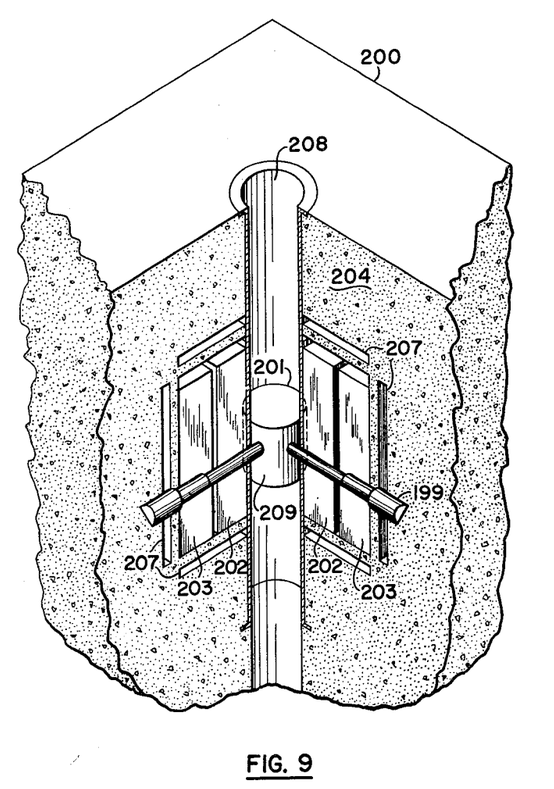
FIG. 9 is a sectional perspective view of a reactor design which is employed in a specific embodiment of the present invention.

Referring now to FIG. 9, the reactor 200 consists of a fuel lattice arrangement surrounded by a beryllium reflector 201. These in turn are placed in a deep heavy water filled well (not shown) and surrounded by additional graphite moderator 202 and 203 and a biological (concrete) shield 204. The entire system is mounted over a swimming pool (not shown) for removal and storage of radioactive material. Reactor 200 is also provided with a space for lattice 209, horizontal beam hole 199, reactor tank 208 and thermal shield 207.

Figure 10:
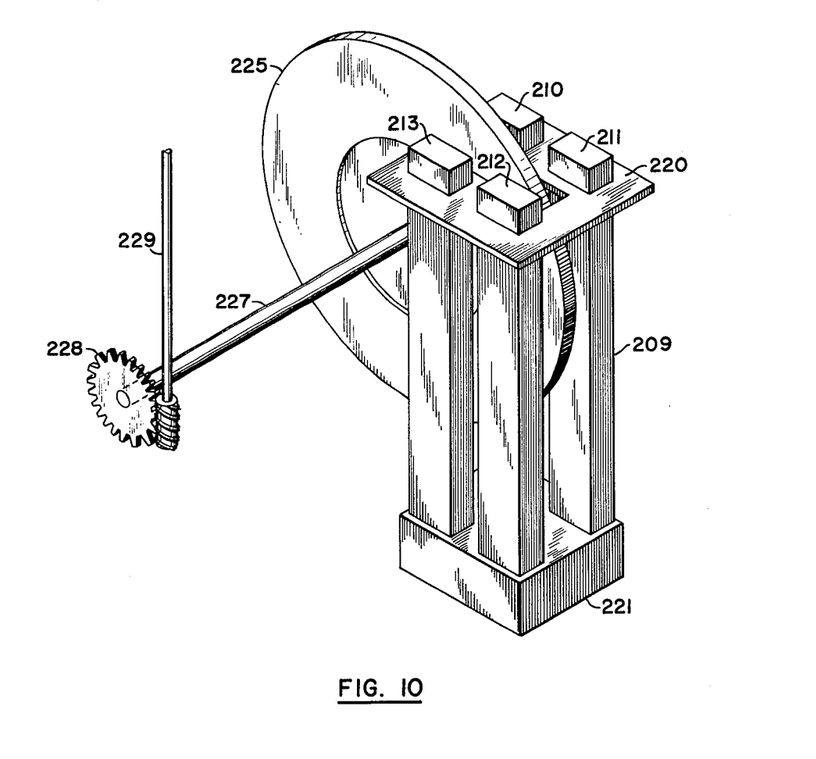
FIG. 10 is a detailed exploded perspective view of a nuclear reactor of the present invention which is employed in conjunction with FIG. 9.

Referring now to FIG. 10, the lattice 209 consists of stationary fuel elements 210, 211, 212 and 213 and appropriate guides 220 and 221 for placing the fuel in its proper place. The revolving disc 225 rotates on a shaft 227 operated through gears 228 on a perpendicular shaft 229 out through the top well and shield plug. The additional cooling is obtained by forced convection obtained by either forcing cooling liquid past the disc or simply by using the increased heat transfer coefficient due to the speed of rotation and increased surface area.

Figure 11:
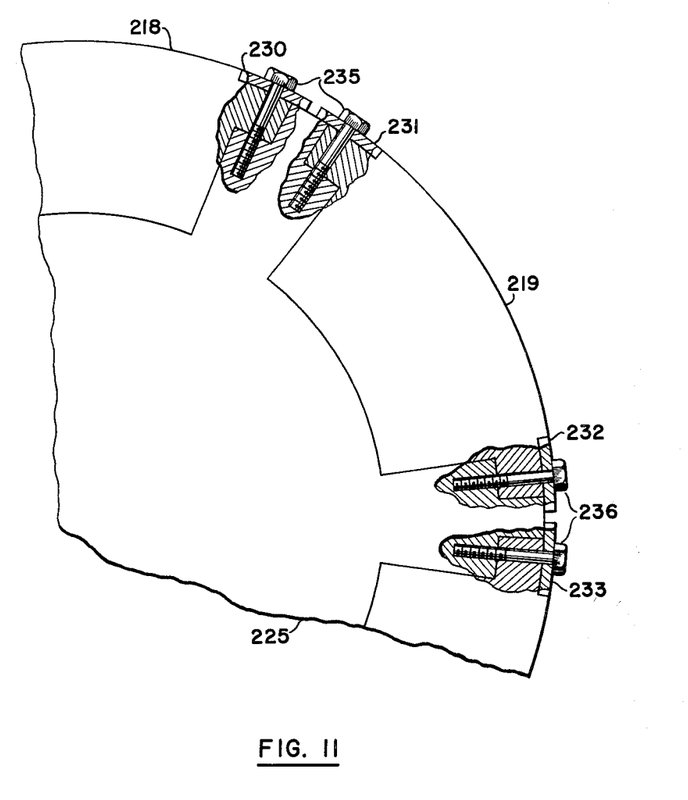
FIG. 11 is a detailed view in partial section of the moving solid fuel element shown in FIG. 10.

Referring now to FIG. 11, the uranium fuel 218 and 219 is attached into a series of grooves on the outer edge of the disc 225 and held in place by a series of locking plates 230, 231, 232, 233. Fuel element sections can be removed by detaching the locking plate holding the desired element and then removing it using the same rods that fit down the well for the removal of the stationary fuel elements. For example, bolts 235 and 236 may be removed in order to free fuel element 219 for withdrawal.

The specifications for the nuclear reactor 200 are as follows.

Specifications:
  Thermal flux—$0.5 \times 10^{15}$ neutrons/cm.$^2$/sec.
  Fast flux—$0.2 \times 10^{15}$ neutrons/cm.$^2$/sec.
  Power level—50,000 kw.
  Active core dimensions—32 cm. x 56 cm. x 48 cm. high
  Beryllium reflector—6' diameter x 3' high
  Aluminum tank—6' 1" diameter, 30 ft. deep
  Secondary moderator (external dimensions):
    (a) Solid graphite—12' x 14' x 10' high
    (b) 1" diameter, pebble graphite 8' x 8' x 10' high
  Weight:
    Fixed fuel elements—1,000 gms. of U-235 (total)
    Movable uranium disc—5,000 gms. of U-235
    Critical mass section—2,000 gms. of U-235
  Uranium disc assembly diameter—2 feet
    Water cooling rate for reflector—10,000 gal./min.
    Air cooling rate for graphite—1,000 lb./min.

Each of the four fixed fuel elements comprises a mixture of aluminum and enriched uranium (containing about 93% of U-235) and contains about 250 gms. of U-235. The dimensions of each fixed fuel element are about 19 cm. x 10 cm. x 48 cm. high and these elements are disposed approximately in the four corners of the core. The uranium fuel arranged on the periphery of disc 225 has essentially the same composition as do the fixed fuel elements. The width of the band of uranium fuel on the disc is approximately 10 cm. and the thickness of the disc is approximately 6 cm. The central portion of the disc 225 is constructed of aluminum. The disc is arranged with respect to the fixed fuel elements as shown in FIG. 10 and is spaced approximately 3 cm. from the surfaces of the fixed fuel elements. The uranium band of the disc 225 is disposed essentially centrally of the four fixed elements.

During the operation of the reactor the disc 225 is revolved at about 1,000 revolutions/min. and the heavy water moderator is circulated through the core to serve both as a coolant and a moderator. The major portion of the heat of nuclear reaction is generated in the disc 225 and this heat is transferred to the heavy water which is cooled external to the reactor. The heavy water enters the core area at about 300° F. and exits at about 650° F., a pressure of about 1000 p.s.i.g. being maintained on the system. Control rods may be employed in conventional manner in the present reactor if desired. Also, if desired each of the fixed fuel elements may comprise a plurality of spaced plates and the disc may also comprise a high surface area element (e.g., a finned disc) to thereby increase the available heat transfer surfaces. Also if desired, ordinary water or hydrocarbons may be substituted for the heavy water, in which case a higher fast neutron flux will be obtained. If hydrocarbons are employed, these may serve as a coolant and in addition may be converted (by passage through the core) to more valuable products.

What is claimed is:

1. An improved heterogeneous nuclear reactor which comprises more than one solid fuel element movably mounted relative to each other, at least a minor portion of each being disposed for association in critical mass relationship to form a reactor core and all of said fuel elements having a major portion thereof external to said core, means external to said core for cooling said major portion of all of said fuel elements, and means for moving said fuel elements having a major portion external to the core relative to each other continuously through said core to separate said minor portions of each fuel element and destroy the critical mass relationship existing between said fuel elements whereby the nuclear reaction between said minor portions is quenched and all of said minor portions are cooled by moving them into heat exchange relationship with said cooling means.

2. An improved heterogeneous reactor which comprises more than one solid circular disc fuel element movably mounted relative to each other, at least a minor portion of each disc being disposed for association in critical mass relationship to form a critical mass core and all of said fuel elements having a major portion thereof external to said core, means for cooling said core and means external to said core for cooling said major portion of all of said fuel elements, and means for moving said fuel elements having a major portion external to the core continuously relative to each other through said core to separate said minor portions of each fuel element and destroy the critical mass relationship existing therebetween whereby the nuclear reaction between said minor portions is quenched and all of said minor portions are cooled by moving them into heat exchange relationship with said cooling means.

3. A nuclear reactor according to claim 1 wherein said moving solid fuel elements comprise a plurality of overlapping rotating discs.

4. A nuclear reactor according to claim 1 wherein said moving solid fuel elements are substantially continuous elongated elements.

5. An improved nuclear reactor which comprises a plurality of overlapping disc solid fuel elements rotatably mounted relative to each other, disposed in critical mass relationship to form a reactor core at the point of overlap, each of said rotating discs containing a mass distribution of fissionable material insufficient alone to maintain a continuous chain nuclear reaction, and having a substantial portion thereof external to said core, means for essentially continuously rotating each of said discs relative to each other, and means for cooling each of said discs external to said core.

6. An improved method for effecting a controlled nuclear reaction between more than one solid fuel element having at least a minor portion of each associated in critical mass relationship to form a nuclear reaction zone, which method comprises moving all sources of fissionable solid material continuously through said zone to bring successive portions thereof into critical mass relationship with at least a portion of another source of fissionable solid material within said reaction zone, separating said portions of said solid fuel elements from each other to quench the nuclear reaction therebetween, and cooling all of said separated portions external to said zone of critical mass.

7. An improved method for effecting control of a reactor which comprises more than one solid circular disc fuel element having a minor portion of each of said discs overlapping in a zone of critical mass relationship to form a critical mass core, which method comprises moving all sources of fissionable solid material continuously through said core to bring successive portions thereof into critical mass relationship with at least a portion of another disc containing fissionable solid material within said core, separating said portions of said discs from each other to quench the nuclear reaction therebetween, and cooling said core and separated portions external to said zone of critical mass by continuously passing a cooling fluid through said core and said portions of said discs external to said core.

8. An improved method for effecting controlled nuclear reaction between more than one solid fuel element having a minor portion of each associated in critical mass relationship to form a critical nuclear reaction zone, which method comprises moving all sources of fissionable solid material continuously through said zone to bring successive portions thereof into critical mass relationship with at least a portion of another source of fissionable solid material, also moving continuously through said reaction zone, wherein the linear velocity of said material through said zone is about 10 to 300 ft./sec., and the residence time of successive portions of said fuel elements in said critical mass zone is about 0.01 to 0.1 second, separating said portions of said solid fuel elements from each other to quench the nuclear reaction therebetween, and cooling said separated portions external to said zone of critical mass.

9. An improved method for effecting controlled nuclear reaction between more than one overlapping rotating disc solid fuel element having a minor portion of each associated in critical mass relationship to form a critical nuclear reaction zone, which method comprises rotating all discs of fissionable solid material continuously through said zone to bring successive portions thereof into critical mass relationship with a portion of another disc of fissionable solid material, also moving continuously through said reaction zone, wherein the linear velocity of said material through said zone is about 10 to 300 ft./second, and the residence time of successive portions of said fuel elements in said critical mass zone is about 0.01 to 0.1 second, separating said portions of said solid fuel elements from each other to quench the nuclear reaction therebetween, and cooling said zone and said separated portions external to said zone of critical mass by continuously passing a cooling fluid in direct contact with said disc.

10. A nuclear reactor comprising a housing; more than one support rod positioned within said housing in parallel relationship with each other and in spaced relationship with one another to form the edges of a plane perpendicular to the axis of said support rods; each support rod having a plurality of circular plates movably mounted relative to each other, said plates positioned in spaced relationship with one another and surrounding said support rods; said plates being positioned alternately in a direction parallel to the axis of said support rods, said plates being spaced from one another and being of such size as to overlap at the center of the plane formed by said support rods; means to rotate said plates about said support rods, neutron moderator material adjacent to said plates, said plates being formed at least in part of fissionable material so that said overlapping sections form a critical mass to sustain a nuclear reaction, at least one control element of a neutron adsorbing material, adjustably positioned within said housing, and means to circulate a coolant through said housing so that said coolant is in continuous heat exchange relationship with said plates.

11. A nuclear reactor comprising a housing; more than two support rods positioned within said housing in parallel relationship with each other and in spaced relationship with one another to form the edges of a plane perpendicular to the axis of said support rods; each support rod having a plurality of circular plates movably mounted relative to each other, said plates positioned in spaced relationship with one another and surrounding said support rods, said plates being positioned alternately in a direction parallel to the axis of said support rods, said plates being spaced from one another and being of such size as to overlap at the center of said plane formed by said support rods, means to rotate said plates about said support rods, neutron moderator material positioned adjacent to said plates, a control element of neutron adsorbing material positioned adjacent to one of said circular plates, means to move said control element toward and away from the circular plate it is positioned adjacent to, said plates being formed at least in part of fissionable material so that said overlapping sections form a critical mass to sustain a nuclear reaction, a control rod of neutron adsorbing material extending into said housing adjacent to said plates, means to move said control rod toward and away from said plates and means to circulate a coolant through said housing so that said coolant is in continuous heat exchange relationship with said plates.

12. The reactor of claim 11 wherein said plates are each formed of a center core of nonfissionable material which is surrounded by ring of fissionable material, said plates being positioned so that the overlapping section includes said fissionable material.

13. A nuclear reactor comprising a housing for support rods positioned within said housing in parallel relationship with each other and in space relationship with one another to form the corners of a square plane perpendicular to the axis of said support rods; each of said support rods containing circular plates movably mounted relative to each other, said plates positioned in space relationship with one another within said housing and surrounding said support rods, said plates being positioned alternately in a direction parallel to the axis of said support rods, said plates being spaced from one another and being of such size as to overlap at the center of said square plane; means to rotate said plates about said support rods, neutron moderator material positioned adjacent to said plates; a control element of neutron absorbing material positioned adjacent to said circular plates, means to move said control elements toward and away from the zone of critical mass, said plates being formed at least in part of fissionable material so that said overlapping sections form a critical mass to sustain a nuclear reaction; a control rod of neutron absorbing material extending into said housing adjacent to said plates, means to move said control rod toward and away from said zone of critical mass; and means to circulate a coolant continuously through said housing so that said coolant is in continuous heat exchange relationship with said plates.

References Cited in the file of this patent

UNITED STATES PATENTS

| | | |
|---|---|---|
| 2,812,304 | Wheeler | Nov. 5, 1957 |
| 2,936,277 | MacNeill et al. | May 10, 1960 |
| 2,986,504 | Goslee et al. | May 30, 1961 |

FOREIGN PATENTS

| | | |
|---|---|---|
| 233,011 | Switzerland | Oct. 2, 1944 |
| 526,793 | Belgium | Mar. 15, 1954 |

OTHER REFERENCES

Physical Review, vol. 74, No. 10, 1948, pp. 1330–1332.